United States Patent
Choi et al.

(10) Patent No.: US 10,257,497 B2
(45) Date of Patent: Apr. 9, 2019

(54) DEPTH SENSOR, THREE-DIMENSIONAL CAMERA, AND METHOD OF CONTROLLING NOISE OF MACRO PIXEL

(71) Applicant: SAMSUNG ELECTRONICS CO., LTD., Suwon-si (KR)

(72) Inventors: Jaehyuk Choi, Seoul (KR); Jinmyoung Kim, Hwaseong-si (KR); Jungwoo Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 104 days.

(21) Appl. No.: 15/353,023

(22) Filed: Nov. 16, 2016

(65) Prior Publication Data

US 2017/0180658 A1    Jun. 22, 2017

(30) Foreign Application Priority Data

Dec. 21, 2015 (KR) .......................... 10-2015-0182793

(51) Int. Cl.
| | |
|---|---|
| H04N 5/361 | (2011.01) |
| H04N 13/254 | (2018.01) |
| H04N 13/25 | (2018.01) |
| H04N 13/296 | (2018.01) |
| G01S 17/89 | (2006.01) |
| G01S 7/486 | (2006.01) |
| G01S 7/487 | (2006.01) |
| G01S 7/497 | (2006.01) |

(52) U.S. Cl.
CPC ......... *H04N 13/254* (2018.05); *G01S 7/4863* (2013.01); *G01S 7/4876* (2013.01); *G01S 7/497* (2013.01); *G01S 17/89* (2013.01); *H04N 13/25* (2018.05); *H04N 13/296* (2018.05)

(58) Field of Classification Search
CPC .... H04N 13/254; H04N 13/296; H04N 13/25; G01S 7/4863; G01S 7/4876; G01S 7/497; G01S 17/89
USPC .......................................................... 348/46
See application file for complete search history.

(56) References Cited

U.S. PATENT DOCUMENTS

2001/0052985 A1* 12/2001 Ono ........................ G01S 17/89
356/614
2006/0131480 A1    6/2006 Charbon et al.
(Continued)

FOREIGN PATENT DOCUMENTS

| JP | 7-167648 A | 7/1995 |
|---|---|---|
| KR | 10-2011-0136828 A | 12/2011 |
| KR | 10-2014-0134183 A | 11/2014 |

*Primary Examiner* — Nguyen T Truong
(74) *Attorney, Agent, or Firm* — Sughrue Mion, PLLC (57) ABSTRACT

A depth sensor and a 3D camera include a macro pixel that provides an output signal when light is received and a programmable concurrent detector (PCD) circuit that compares an electric signal provided by the macro pixel with a number of concurrence (NC) and determines a necessity of providing the output signal of the macro pixel. In addition, the depth sensor and the 3D camera may include a controller that measures a dark count of the macro pixel, changes the number of concurrence (NC) of the macro pixel, based on the dark count, and controls noise of the macro pixel. In addition, the depth sensor and the 3D camera may control the noise of the macro pixel, based on an external light count which is a noise signal generated due to the external light.

20 Claims, 8 Drawing Sheets

(56) References Cited

U.S. PATENT DOCUMENTS

2011/0291017 A1 12/2011 Frach
2012/0075615 A1 3/2012 Niclass et al.

* cited by examiner

FIG. 1

OB : Object
DS : Depth Sensor
LD : Light Driver
MPA : Macro Pixel Array
CA : Camera
F : Filter
L : Lens

DEPTH SENSOR, THREE-DIMENSIONAL CAMERA, AND METHOD OF CONTROLLING NOISE OF MACRO PIXEL

CROSS-REFERENCE TO RELATED APPLICATION

This application claims priority from Korean Patent Application No. 10-2015-0182793, filed on Dec. 21, 2015, in the Korean Intellectual Property Office, the disclosure of which is incorporated herein by reference in its entirety.

BACKGROUND

1. Field

Exemplary embodiments relate to a depth sensor, a three-dimensional (3D) camera, and a method for controlling noise of a macro pixel.

2. Description of the Related Art

A 3D camera includes a function of measuring a distance from a plurality of points on an object to the 3D camera, in addition to the function of image shooting. Various algorithms have been developed to measure the distance between the object and the 3D camera, and the algorithm of the 3D camera generally utilizes a Time-of-Flight (TOF) method. The TOF method measures the flight time of illumination light reflected from the object and received by a depth sensor after the illumination light is irradiated to the object.

The depth sensor of the 3D camera utilizes a plurality of photoelectric conversion elements. Each photoelectric conversion element is biased to a high voltage and operates in breakdown and Geiger ranges. Each photoelectric conversion element operating in such biased ranges may generate noise. Research on an apparatus for and a method of eliminating the noise generated by the photoelectric conversion element has been conducted.

SUMMARY

Provided are a depth sensor, a three-dimensional (3D) camera and a method for controlling noise that relates to a macro pixel.

Additional aspects will be set forth in part in the description which follows and, in part, will be apparent from the description, or may be learned by practice of the presented exemplary embodiments.

According to an aspect of one or more exemplary embodiments, a depth sensor may include: a first dummy pixel that includes a plurality of first dummy elements and is configured to be shielded from external light; a macro pixel that includes a plurality of photoelectric conversion elements and is configured to photoelectrically convert input light and to provide an electric signal; a programmable concurrence detector (PCD) circuit configured to compare the electric signal with a number of concurrence (NC) that relates to the macro pixel, and to determine a necessity of providing an output signal that corresponds to the macro pixel; a depth circuit configured to receive the output signal from the PCD circuit and obtain distance information that corresponds to the output signal; and a controller configured to measure a dark count that relates to the first dummy pixel, to change the number of concurrence (NC), based on the measured dark count, and to control noise that relates to the macro pixel.

The PCD circuit may include: a signal generator configured to supply a composite signal current to a first node in response to the electric signal; a reference current supplier configured to supply, to the first node, a composite reference current that corresponds to the number of concurrence (NC); and a current comparator connected to the first node and configured to provide the output signal that corresponds to the macro pixel when a magnitude of the composite signal current is greater than a magnitude of the composite reference current.

The signal generator may include: a plurality of signal generator switches, each signal generator switch being configured to switch between an ON state and an OFF state in response to a respective constituent electric signal generated by a corresponding one from among the plurality of photoelectric conversion elements; and a plurality of signal current sources, each signal current source being connected to a corresponding one from among the plurality of signal generator switches and configured to supply a respective constituent signal current to the first node when the corresponding signal generator switch is in the OFF state, wherein the composite signal current may be a sum of the constituent signal currents supplied to the first node.

The reference current supplier may include: a plurality of reference current supplier switches, each reference current supplier switch being configured to be switched between the ON state and the OFF state by the controller, based on the NC; and a plurality of reference current sources, each reference current source being connected to a corresponding one from among the plurality of reference current supplier switches and configured to supply a respective constituent reference current to the first node when the corresponding switch is in the OFF state, wherein the composite reference current may be a sum of the constituent reference currents supplied to the first node.

Each of the plurality of signal current sources and each of the plurality of reference current sources may be further configured to supply a respective current having a same magnitude.

The depth sensor may further include an additional current source configured to supply, to the first node, an additional current that has a magnitude less than the magnitude of each of the respective currents supplied by each of the plurality of signal current sources and by each of the plurality of reference current sources.

A number of the first dummy elements included in the first dummy pixel may be equal to a number of the photoelectric conversion elements included in the macro pixel.

The depth sensor may further include a second dummy pixel which includes a second dummy element and which is configured to receive a flow of the external light into the second dummy pixel, and the controller may be further configured to measure an external light count that relates to the second dummy pixel and to adjust a reverse bias voltage applied to the macro pixel, based on the measured external light count.

The controller may be further configured to adjust the reverse bias voltage based on a value obtained by subtracting the measured dark count from the measured external light count.

The depth sensor may further include a temperature measurer configured to measure an internal temperature thereof, and the controller may be further configured to control the noise of the macro pixel according to the measured internal temperature of the depth sensor.

The controller may be further configured to change the number of concurrence (NC) according to the measured internal temperature of the depth sensor.

The controller may be further configured to control the noise of the macro pixel by lowering the internal temperature of the depth sensor.

According to an aspect of another exemplary embodiment, a 3D camera may include: the depth sensor described above; and a light source configured to irradiate light toward an object.

The depth sensor may further include a second dummy pixel which includes a second dummy element and which is configured to receive a flow of the external light into the second dummy pixel, and the controller may be further configured to measure the external light count that relates to the second dummy pixel and to adjust a reverse bias voltage applied to the macro pixel, based on the measured external light count.

The controller may be further configured to compensate for a reduction in a sensitivity that is caused by the controlling the noise of the macro pixel, by adjusting the light source.

The controller may be further configured to increase a light output of the light source when the NC is increased.

The controller may be configured to increase the light output of the light source when the reverse bias voltage applied to the macro pixel is reduced.

According to an aspect of another exemplary embodiment, a method for controlling a depth sensor is provided. The depth sensor includes: a macro pixel which includes a plurality of photoelectric conversion elements and is configured to photoelectrically convert an input light and to provide a current signal; and a PCD circuit configured to compare the current signal provided by the macro pixel with a number of concurrence (NC) and to determine a necessity of providing an output signal that corresponds to the macro pixel. The method includes: providing a first dummy pixel which includes a plurality of first dummy elements and is configured to be shielded from external light; measuring a dark count that relates to the first dummy pixel; and controlling noise that relates to the macro pixel by changing the number of concurrence (NC) of the PCD circuit, based on the measured dark count.

The method for controlling the depth sensor may further include: measuring an external light count that relates to a second dummy pixel which includes a plurality of second dummy elements and which is configured to receive a flow of the external light into the second dummy pixel; and controlling the noise of the macro pixel by adjusting a reverse bias voltage applied to the macro pixel, based on the measured external light count.

The controlling operation with respect to the noise of the macro pixel may include adjusting the reverse bias voltage applied to the macro pixel, based on a value obtained by subtracting the measured dark count from the measured external light count.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects.

The present inventive concept will now be described more fully with reference to the accompanying drawings, in which exemplary embodiments of the present inventive concept are shown. The present inventive concept may, however, be embodied in many different forms and should not be construed as being limited to the exemplary embodiments set forth herein; rather, these exemplary embodiments are provided so that this disclosure will be thorough and complete, and will fully convey the concept of the exemplary embodiments to those of ordinary skill in the art. In the drawings, the thicknesses of layers and regions are exaggerated for clarity.

While the present inventive concept has been particularly shown and described with reference to exemplary embodiments thereof, it will be understood by those of ordinary skill in the art that various changes in form and details may be made therein without departing from the spirit and scope of the present inventive concept as defined by the appended claims. The exemplary embodiments should be considered in a descriptive sense only and not for purposes of limitation. Therefore, the scope of the present inventive concept is defined not by the detailed description of the exemplary embodiments but by the appended claims, and all differences within the scope will be construed as being included in the present inventive concept.

Throughout the specification, when a portion "includes" an element, another element may be further included, rather than excluding the existence of the other element, unless otherwise described.

As used herein, the singular forms "a," "an" and "the" are intended to include the plural forms as well, unless the context clearly indicates otherwise.

Detailed descriptions of exemplary embodiments will be provided below with reference to drawings so that one of ordinary skill in the art may realize the exemplary embodiments. In the description of the exemplary embodiments, certain detailed explanations of the related art are omitted when it is deemed that they may unnecessarily obscure the essence of the exemplary embodiments.

Figure 1:
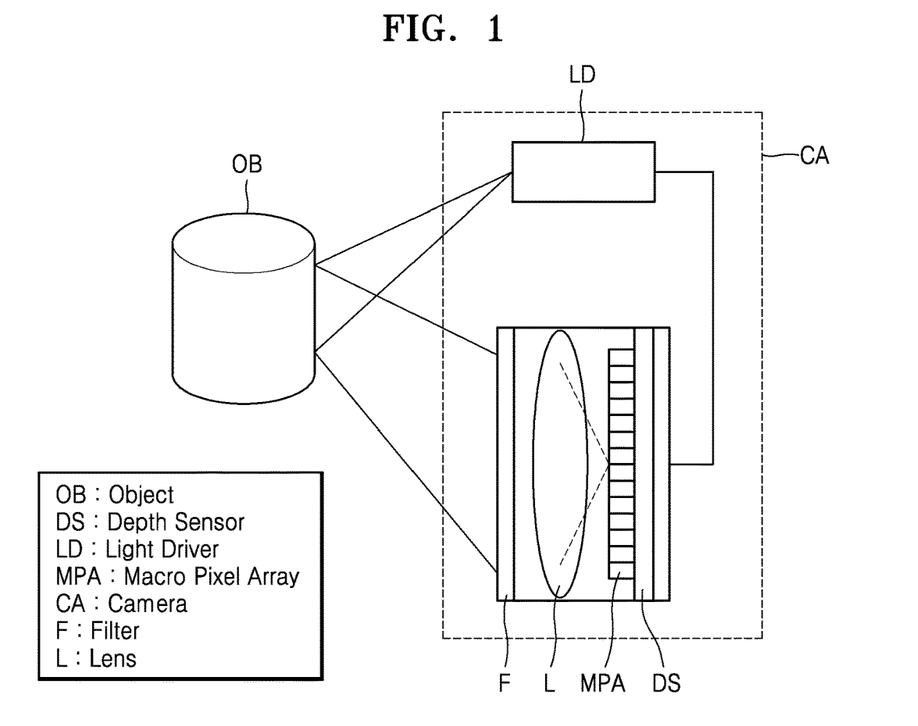
FIG. 1 is a diagram illustrating a schematic configuration of a three-dimensional (3D) camera, according to an exemplary embodiment.
Figure 2:
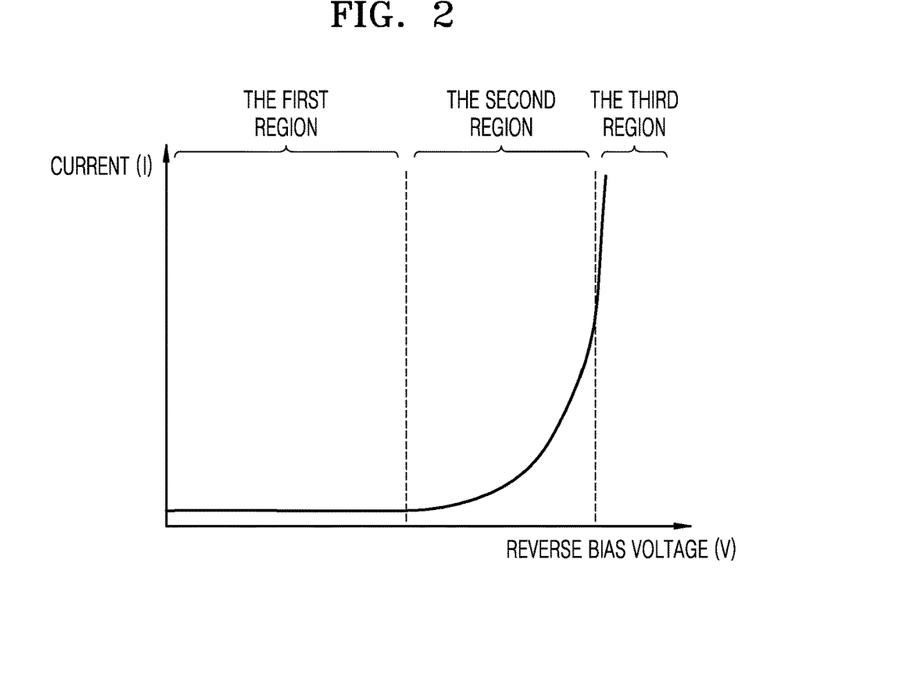
FIG. 2 is a graph illustrating ranges of a photo diode in response to an applied voltage.

FIG. 1 is a diagram illustrating a schematic configuration of a three-dimensional (3D) camera (CA), according to an exemplary embodiment. FIG. 2 is a graph illustrating ranges of a photo diode in response to an applied voltage.

Referring to FIG. 1, the 3D camera (CA) may include a light source (LS) that irradiates light toward an object (OB), a lens (L) that collects a reflected light from an object (OB), a macro pixel array (MPA), and a depth sensor (DS).

The 3D camera (CA) may have a function of measuring a distance to the object (OB). In various exemplary embodiments, the 3D camera (CA) may measure the distance to the object (OB) via the Time-of-Flight (TOF) method. The TOF method measures the flight time of an illumination light reflected from the object and received by a depth sensor after being irradiated toward the object. A measurement of the TOF may be performed by a time delay circuit (TDC) included in the depth sensor (DS). A detailed configuration of the depth sensor will be described below.

The light source (LS) may irradiate light to measure the distance to the object (OB.) Light of various frequency ranges may be used. For example, the light source (LS) may use light that has a frequency in an infrared range when usage under daylight is considered. In this case, noise of the 3D camera that might otherwise be caused by natural light in a visible light range, such as, for example, sunlight, may be prevented. The light source (LS) may include additional optical elements, such as a diffuser and a beam expander, for effective irradiation of light to the object (OB). In addition, the light source (LS) may include a light source driver that adjusts the light output.

The photoelectric conversion element may emit an electric signal according to an applied voltage. The photoelectric conversion element may include, for example, a photo diode. The photoelectric diode may be a single-photon avalanche diode (SPAD). Referring to FIG. 2, an x-axis of the graph denotes a reverse bias voltage (V) applied to the photo diode, and a y-axis denotes a current (I) of the electric signal output by the photo diode. An operational range of the photo diode may be divided into a first range, a second range, and a third range which are indicated by a slope change of the graph. The first range represents a conventional mode in which a sensitivity of the photo diode is low, the second range represents a linear mode in which the sensitivity of the photo diode approximately linearly increases, and the third range represents a Geiger mode in which the sensitivity of the photo diode exponentially increases. When operating in the second and third ranges, the photo diode may have a relatively high sensitivity and therefore output the electric signal even for an input of a single photon. The photoelectric conversion element may include, as another example, a photo transistor.

A filter (F) may block light of all frequencies except that of light irradiated by the light source (LS). For example, when the light source (LS) irradiates light in an infrared range, the filter (F) may act as a visible light blocking filter or as an infrared transmitting filter. When light from the light source is relatively intense, the visible light blocking filter may fail to completely block the visible light. Due to a portion of the visible light which is not completely blocked, the macro pixel may generate an electric signal which is related to noise. A detailed description of this will be provided below.

The depth sensor (DS) may use the electric signal generated in the macro pixel array (MPA) and obtain a 3D image by measuring the TOF of light with respect to each macro pixel within the MPA. The depth sensor (DS) may include a macro pixel array (MPA) which includes the plurality of macro pixels, an analog front end (AFE) circuit that converts the electric signal delivered from the macro pixel into a pulse, a concurrent detector (CD) circuit that determines a necessity of providing an output signal based on on the electric signal delivered from the macro pixel, a depth circuit (DC) that obtains distance information with respect to each macro pixel, based on the output signal delivered from the CD circuit, and/or any other suitable components. The depth circuit (DC) may include the time delay circuit (TDC), a digital signal processor, a digital readout unit, and/or any other suitable elements. The depth circuit (DC) may be one of well-known components in the depth sensor (DS) and the 3D camera (CA).

The macro pixel array (MPA) may be a two-dimensional (2D) array of macro pixels. The macro pixel may include at least one of photoelectric conversion elements that convert a photon into an electric signal. The macro pixel may generate the electric signal when the reflected light from the object (OB) reaches the macro pixel. When the macro pixel generates the electric signal without external light, just as light has been received, this electric signal is related to the noise. A detailed description of this will be provided below.

The 3D image captured by the 3D camera may be degraded due to the noise described above. The depth sensor (DS) may include a configuration to control the noise and a detailed description thereof will be provided below.

Figure 3A:
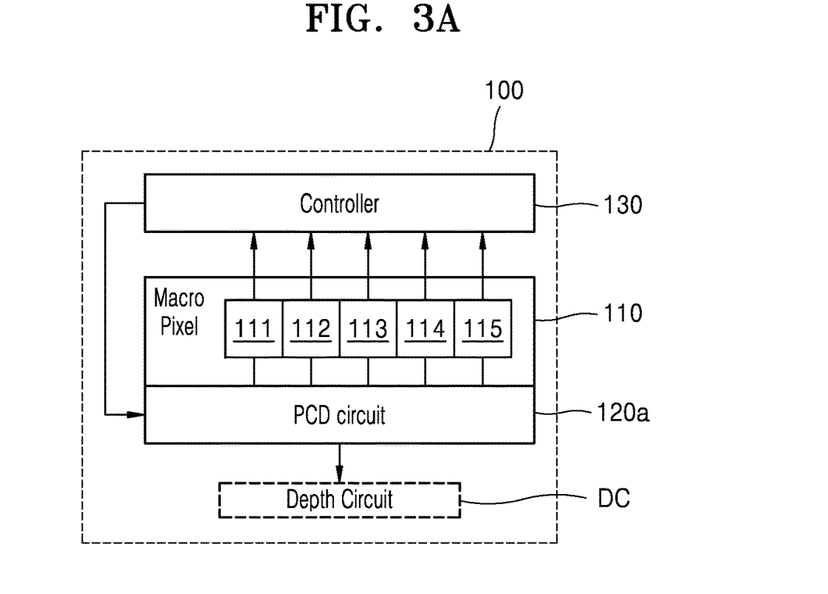
FIG. 3A is a diagram illustrating a schematic configuration of a depth sensor, according to an exemplary embodiment.
Figure 3B:
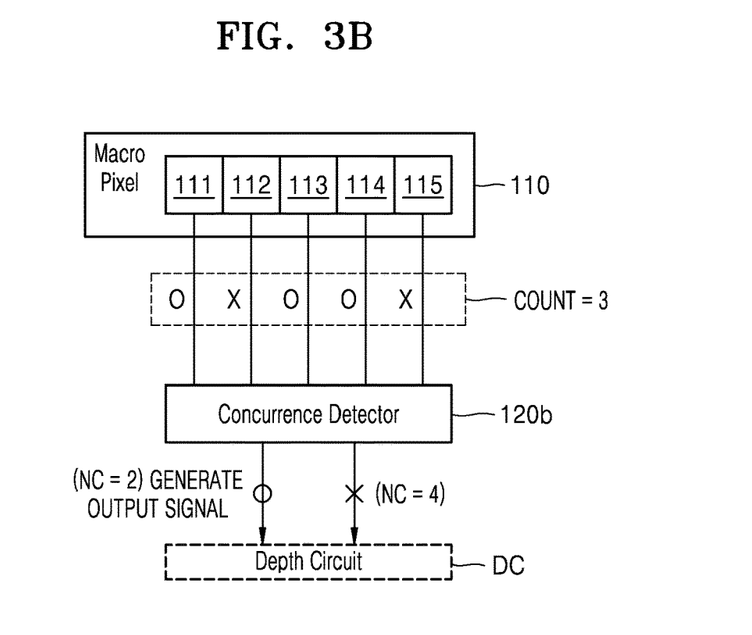
FIG. 3B is a diagram illustrating an operational principle of a concurrent detector (CD) circuit.

FIG. 3A is a diagram illustrating a schematic configuration of a depth sensor 100, according to an exemplary embodiment. FIG. 3B is a diagram illustrating an operational principle of a concurrent detector (CD) circuit 120b.

Referring to FIG. 3A, the depth sensor (DS) may include a macro pixel 110 which includes a plurality of photoelectric conversion elements 111, 112, 113, 114, and 115, a programmable concurrence detector (PCD) circuit 120a configured to determine an existence of an output from the macro pixel 110, and a controller 130.

The macro pixel 110 may include the plurality of photoelectric conversion elements 111 through 115 in order to determine the presence of an incident light. The photoelectric conversion elements 111 through 115 may be implemented, for example, as a single photon avalanche diode. When light is incident on the macro pixel 110, the plurality of photoelectric conversion elements 111 through 115 therein may convert a light signal into an electric signal and output the electric signal. The photoelectric conversion elements 111 through 115 may output a certain amount (i.e., magnitude) of an electric signal. The electric signal delivered from the photoelectric conversion elements 111 through 115 may be connected via the AFE circuit and converted into a pulse signal. The macro pixel 110 is illustrated as a single component in the drawing; however, this is for the sake of convenience only, and the depth sensor 100 may include a plurality of macro pixels 110. For example, the macro pixels 110 may be arranged in a 2D array and compose the macro pixel array, which is illustrated as the MPA in FIG. 1.

The photoelectric conversion element 111 may include the single photon avalanche diode as described above. Since the single photon avalanche diode has a relatively high sensitivity for light, the single photon avalanche diode may generate the electric signal based on a weak light signal. However, the single photon avalanche diode may output the electric signal even when no light is incident thereon. A count that relates to such an electric signal is denoted as a dark count. A dark count rate (DCR) may be expressed as the number of electrons generated per time at a given temperature or as a unit of a current value per unit sensor area at the given temperature.

Referring to FIG. 3B, the CD circuit 120*b* may count the number of electric signals received from the macro pixel 110, compare this number with the number of concurrence (NC), and determine the necessity of providing the output signal that corresponds to each macro pixel 110 based on a result of the comparison. Provision of the output signal may indicate that light information is included in the corresponding macro pixel 110. Conversely, a lack of provision of the output signal may indicate that light information is not included in the corresponding macro pixel 110. For example, the macro pixel 110 may include five photoelectric conversion elements 111 through 115. When light is input onto the macro pixel 110, a subset of the photoelectric conversion elements 111 through 115 may output electric signals, while the remaining subset may not output electric signals. For example, three photoelectric conversion elements 111, 113 and 114 may generate electric signals (illustrated as O in FIG. 3B), while two photoelectric conversion elements 112 and 115 may not generate electric signals (illustrated as X in FIG. 3B). Such electric signals may be counted by the CD circuit 120*b*, which determines the necessity of providing the output signal. The CD circuit 120*b* may compare the counted number of electric signals with the number of concurrence (NC) and determine the necessity of providing the output signal based on a result of the comparison. The CD circuit 120*b* may compare the counted number of electric signals, i.e., 3, with the number of concurrence (NC). When the number of concurrence (NC) is 2, the counted number of electric signals is greater than the number of concurrence (NC) and therefore, the CD circuit 120*b* may provide the output signal to the depth circuit (DC). The depth circuit (DC) may provide depth information by calculating the TOF of light, based on the provided output signal. Accordingly, an occurrence of the output signal in the CD circuit 120*b* may indicate that image information is included in the corresponding macro pixel 110. Conversely, when the number of concurrence (NC) is 4, the counted number of electric signals (i.e., 3) is less than the number of concurrence (NC) and therefore, the CD circuit 120*b* may make a determination not to provide the output signal to the depth circuit (DC). This case may indicate that image information is not included in the corresponding macro pixel 110. As described above, when the number of concurrence (NC) of the CD circuit is changed, the occurrence of the output signal may vary. The sensitivity of the macro pixel 110 may rely on the number of concurrence (NC) and the noise of the macro pixel 110 may be controlled by changing the number of concurrence (NC). The PCD circuit 120*a* may indicate a CD circuit which may change the number of concurrence (NC). A detailed description with respect to the PCD circuit 120*a* will be provided in conjunction with a description of FIGS. 4 and 5 below.

The controller 130 may measure the dark count that occurs in the macro pixel 110. For example, the controller 130 may include an analog counter or a digital counter. The analog counter may measure the dark count based on a magnitude of the electric signal which is accumulated therein. The digital counter may measure the dark count based on a discrete number of electric pulse signals. The controller 130 may adjust the number of concurrence (NC) of the PCD circuit 120*a*, based on the measured dark count.

An adjustment of the number of concurrence (NC) of the controller 130, based on the dark count, will now be described. When the dark count is large, it may be difficult to determine whether the generation of the electric signal output from the photoelectric conversion element 111 through 115 is based on the dark count or due to light. Further, when the dark count is too small, a weak light incident on the photoelectric conversion elements 111 through 115 may not trigger an output the electric signal. The controller 130 may select an adequate number of concurrence (NC) by monitoring a relationship between the dark count generated in the macro pixel 110 and the image on the 3D camera that includes the depth sensor.

For example, the controller 130 may measure the dark count of the macro pixel 110 and a sample image may be captured by using the 3D camera (CA in FIG. 1) that includes the corresponding macro pixel 110. When the noise of the photographed image is severe, the sensitivity of the macro pixel 110 may be relatively high and thus, a value of the number of concurrence (NC) of the PCD circuit 120*a* may be increased by ΔNC. When the photographed image is blurry, the sensitivity of the macro pixel 110 may be relatively low and thus, a value of the number of concurrence (NC) of the PCD circuit 120*a* may be decreased by ΔNC. As a result, an adequate value of the number of concurrence (NC) may be obtained by capturing sample images with respect to the dark count of the macro pixel 110 which is the subject of the measurement.

The adequate value of NC may be defined as an integer for which a quality of the photographed image may be acceptable. A basis to determine whether the quality of the photographed image is acceptable may be that the depth information that relates to the object is accurately reflected in the sample image. An adequate value of the number of concurrence (NC), based on the dark count, may have previously been stored in a memory (not illustrated) of the controller 130 in advance. For example, the controller 130 may adjust the number of concurrence (NC) of the PCD circuit 120*a* to a suitable value by reading, from the memory, the number of concurrence (NC) that corresponds to the measured dark count.

The depth sensor 110 may include the macro pixel array (MPA in FIG. 1) which includes the plurality of macro pixels 110. The controller 130 may apply a determined number of concurrence (NC), based on the dark count of a portion of macro pixels 110, to the macro pixel array (MPA in FIG. 1) in batches. When the noise of the macro pixel 110 is adjusted based on the reverse bias voltage, a curved line with a relatively high sensitivity (e.g., as illustrated by the second and third ranges in FIG. 2) may require adjustment. Thus, noise adjustment of the macro pixel 110 using the reverse bias voltage may require a relatively fine adjustment, and thus, it may be difficult to uniformly apply the reverse bias voltage in bulk to respective macro pixels 110 and individual adjustment may be needed with respect to each of the macro pixels 110. However, since the number of concurrence (NC), which is a kind of a threshold value that is used to determine the necessity of generating the output signal, may be discretely controllable, the noise of the macro pixel 110 using the number of concurrence (NC) may be relatively and easily adjustable. Respective macro pixels arranged inside the depth sensor 100 may include photoelectric conversion elements 111 through 115 that have identical numbers, identical kinds, and identical temperature condition status as one another. Even though each of macro pixels 110 may individually have a difference in the respective amount of noise, the adequate value of the number of concurrence (NC) that corresponds to each macro pixel 110 may be approximately equal, with a negligible difference. In addition, even though the number of concurrence (NC) may be varied by the noise difference due to individual characteristics of respective macro pixels 110, it may be simpler that an overall sensitivity adjustment of the macro pixel array (MPA) is performed by an adjustment of the number of concurrence (NC) and a detailed adjustment is performed for each macro pixel.

The controller 130 may measure the dark count from the macro pixel 110 with the external light blocked therefrom. A shield layer arranged on an incident light path or a shutter configured to open and close the incident light path of the depth sensor 100 may be used to block the external light from the macro pixel 110. When the depth sensor 100 is shielded without having a separate macro pixel 110 for a measurement of the dark count, the measurement of the dark count and an operation as the 3D camera may not be simultaneously performed. Thus, a blocking of an in-flow of the external light and the measurement of the dark count that is performed by using dummy pixels which have a configuration that is actually identical to that of the macro pixel 110 may be an effective configuration of the depth sensor 100. A detailed description on the dummy pixel will be provided in conjunction with a description of FIG. 6 below.

Figure 4:
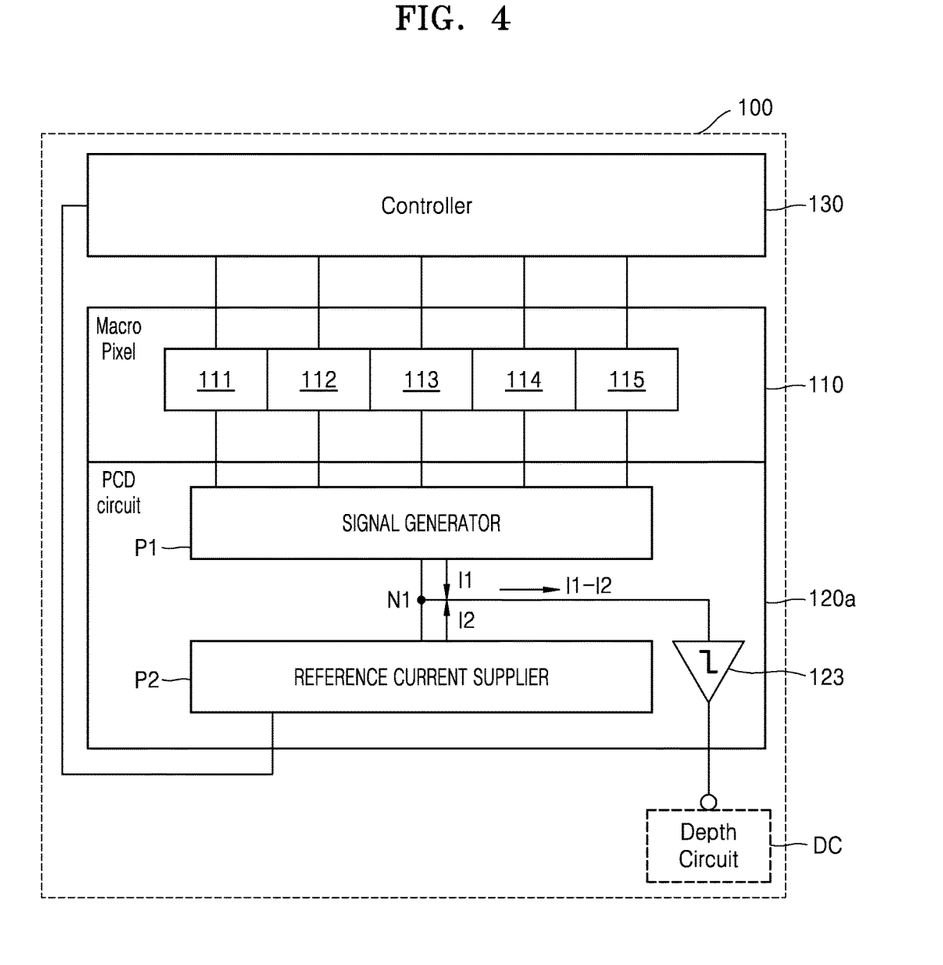
FIG. 4 is a diagram illustrating a schematic configuration of a depth sensor, according to another exemplary embodiment.

FIG. 4 is a diagram illustrating a schematic configuration of a depth sensor 100, according to another exemplary embodiment. In various exemplary embodiments, the PCD circuit 120a may include a signal generator P1 which supplies a composite signal current I1, based on a first node N1, a reference unit (also referred to herein as a "reference current supplier") P2 which supplies a composite reference current I2, based on the first node N1, and a current comparator 123 which receives the signal current I1 and the reference current I2 supplied to the first node N1, compares a relative magnitude between them, and provides the output signal of the macro pixel 110 to the depth circuit (DC) when the signal current I1 is greater than the reference current I2. The configuration of the depth sensor 100 according to the present exemplary embodiment is actually the same as that in FIG. 3A except the PCD circuit 120a, and a duplicate description will be omitted.

When light is input onto the macro pixel 110, each of the photoelectric conversion elements 111 through 115 may provide a respective constituent electric signal to the signal generator P1. The electric signal provided by each of the photoelectric conversion elements 111 through 115 may include a current that has a certain magnitude. Alternatively, each of the photoelectric conversion elements 111 through 115 may be connected to the AFE circuit and output a pulse signal.

The signal generator P1 may provide the first node N1 with the composite signal current I1 which is proportional to a magnitude of the number of constituent electrical signals provided by the photoelectric conversion elements 111 through 115.

The reference unit P2 may provide the first node N1 with the reference current I2 according to a control of the controller 130 and the number of concurrence (NC) determined in the controller 130. For example, a magnitude of the reference current I2 may be proportional to the number of concurrence (NC).

The current comparator 123 may compare the signal current I1 with the reference current I2 supplied to the first node N1 and may provide the output signal from the macro pixel 110 to the depth circuit (DC) when the signal current I1 is greater than the reference current I2. The current comparator 123 may be connected to the first node N1. When one of the signal current I1 and the reference current I2 flows in, with the first node N1 as a reference, the other may leak out from the first node N1. For example, when the first node N1 is regarded as the reference, the signal current I1 may be provided in a flow-in direction and the reference current I2 may be provided in a leak-out direction. In such a case, when the signal current I1 is greater than the reference current I2, a current that has a magnitude equal to I1−I2 with the first node N1 as the reference may flow to the current comparator 123. When the current flowing into the current comparator 123 satisfies a condition of I1−I2>0, the PCD circuit 120a may deliver the output signal to the depth circuit (DC). In case of I1−I2<0, the PCD circuit 120a may make a determination to not deliver the output signal to the depth circuit (DC).

Figure 5:
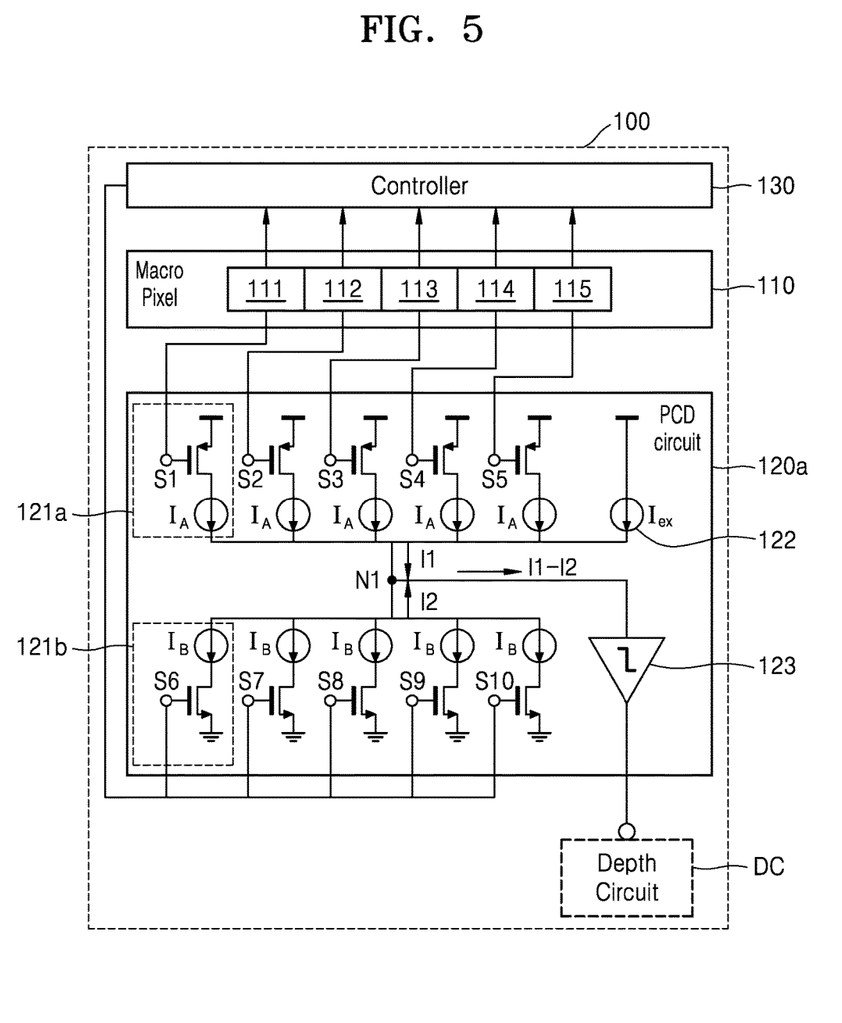
FIG. 5 is a diagram illustrating a schematic configuration of a depth sensor, according to another exemplary embodiment.

FIG. 5 is a diagram illustrating a schematic configuration of a depth sensor 100, according to another exemplary embodiment. In various exemplary embodiments, the depth sensor 100 may include a detailed configuration of the signal generator P1 and the reference unit P2.

The signal generator P1 may be connected to each of signal generator switches S1, S2, S3, S4, and S5, which are a plurality of switches S1 through S5 capable of switching between an ON state and an OFF state in response to respective electric signals generated in the plurality of photoelectric conversion elements 111 through 115, and may include a plurality of signal current sources $I_A$, each of which supplies a respective constituent signal current to the first node N1 the corresponding one of switches S1 through S5 is in the OFF state. Each of switches S1 through S5 may include, for example, a transistor. Each signal current source $I_A$ may provide a current Ia that has a predetermined magnitude to the first node N1.

The signal current I1 may be a sum of the respective constituent signal currents supplied to the first node N1 by each of switches S1 through S5 while in the OFF state.

The reference unit P2 may be connected to each of reference current supplier switches S6, S7, S8, S9, and S10, which are a plurality of switches S6 through S10 that are configured to be switched between an ON state and an OFF state by the controller 130, based on the number of concurrence (NC), and may include a plurality of reference current sources $I_B$, each of which supplies a respective constituent reference current to the first node N1 while the corresponding one of switches S6 through S10 is in the OFF state. Each of switches S6 through S10 may include, for example, a transistor. Each reference current source $I_B$ may provide a current that has a certain predetermined to the first node N1. The reference current source $I_B$ may provide the first node N1 with a current Ib of a same magnitude as the current Ia of the signal current source $I_A$.

The reference current I2 may be a sum of the respective constituent reference currents supplied to the first node N1 by switches S6 through S10 while in the OFF state.

Switches S1 through S5 and signal current sources $I_A$ which correspond to a reference number 121a composing the signal generator P1 may be connected to each of output terminals of the photoelectric conversion elements 111 through 115. When electric signals are delivered via output terminals of the photoelectric conversion elements 111 through 115, switches S1 through S5 may be closed and the current Ia may flow from the signal current source $I_A$ to the first node N1. Thus, a magnitude of the signal current I1 may be determined, based on the number of electric signals delivered via output terminals of the photoelectric conversion element 111 through 115. For example, when electric signals are output via m photoelectric conversion elements in the macro pixel 110 which includes n photoelectric conversion elements, each of the corresponding switches may be closed and the current Ia may be delivered from the signal current source $I_A$ to the first node N1. In this case, the signal current I1 may have a magnitude that is equal to m*Ia.

Switches S6 through S10 and signal current sources $I_B$ which correspond to a reference number 121b composing the reference unit P2 may be connected to the controller 130. After the controller 130 has delivered the number of concurrence (NC), the controller 130 may close the number of switches that corresponds to the number of concurrence (NC) and open the others. Each of the reference current sources $I_B$ that corresponds to a closed switch may deliver the current Ib to the first node N1. In this case, the reference current I2 may have a magnitude that is equal to NC*Ib. A magnitude of the current Ib provided by the reference current source $I_B$ may be identical to that of the current Ia provided by the signal current source $I_A$.

Since the current comparator 123 determines the necessity of providing the output signal of the PCD circuit based on whether a condition formula of I1−I2>0 is satisfied, the condition formula may be changed to (m−NC)*Ia>0. Accordingly, the necessity of providing the output signal of the PCD circuit may be determined based on whether m is greater than NC. When NC is determined as a relatively large number in the controller, a provision frequency of the output signal of the PCD circuit 120a may be reduced, and this may denote a reduction in the sensitivity of the macro pixel 110. Conversely, when NC is determined as a relatively small number in the controller, a provision frequency of output signal of the PCD circuit 120a may increase, which may denote an increase in the sensitivity of the macro pixel 110. The controller may select NC as any one integer between zero (0) and m. As m becomes larger, a range of values for NC which the controller may select becomes wider and thus, a sensitivity adjustment may become finer. However, since m denotes the number of photoelectric conversion elements included inside the macro pixel 110, sizes of the macro pixel 110 and the PCD circuit 120a may be larger as m becomes larger.

Since it is difficult to determine whether the PCD circuit 120a needs to provide the output signal when m is identical to NC, the PCD circuit 120a may further include an additional current source 122 which supplies, to the first node N1, an additional current Iex that is smaller than the current Ia of the signal current source $I_A$ and the current Ib of the reference current source $I_B$. Referring to FIG. 5, the additional current source 122 may be arranged to add the additional current Iex to the signal current I1. In this case, the PCD circuit 120a may deliver the output signal to the outside when the current comparator 123 satisfies {(I1+Iex)−I2}>0. This formula may be rearranged as (m−NC)*Ia+Iex>0 and thus, when m is equal to NC, Iex>0 is satisfied and the PCD circuit 120a may deliver the output signal to the outside. When m is identical to NC and the PCD circuit 120a is not expected to provide the output signal, a direction of current provided by the additional current source 122 may be reversed.

Figure 6:
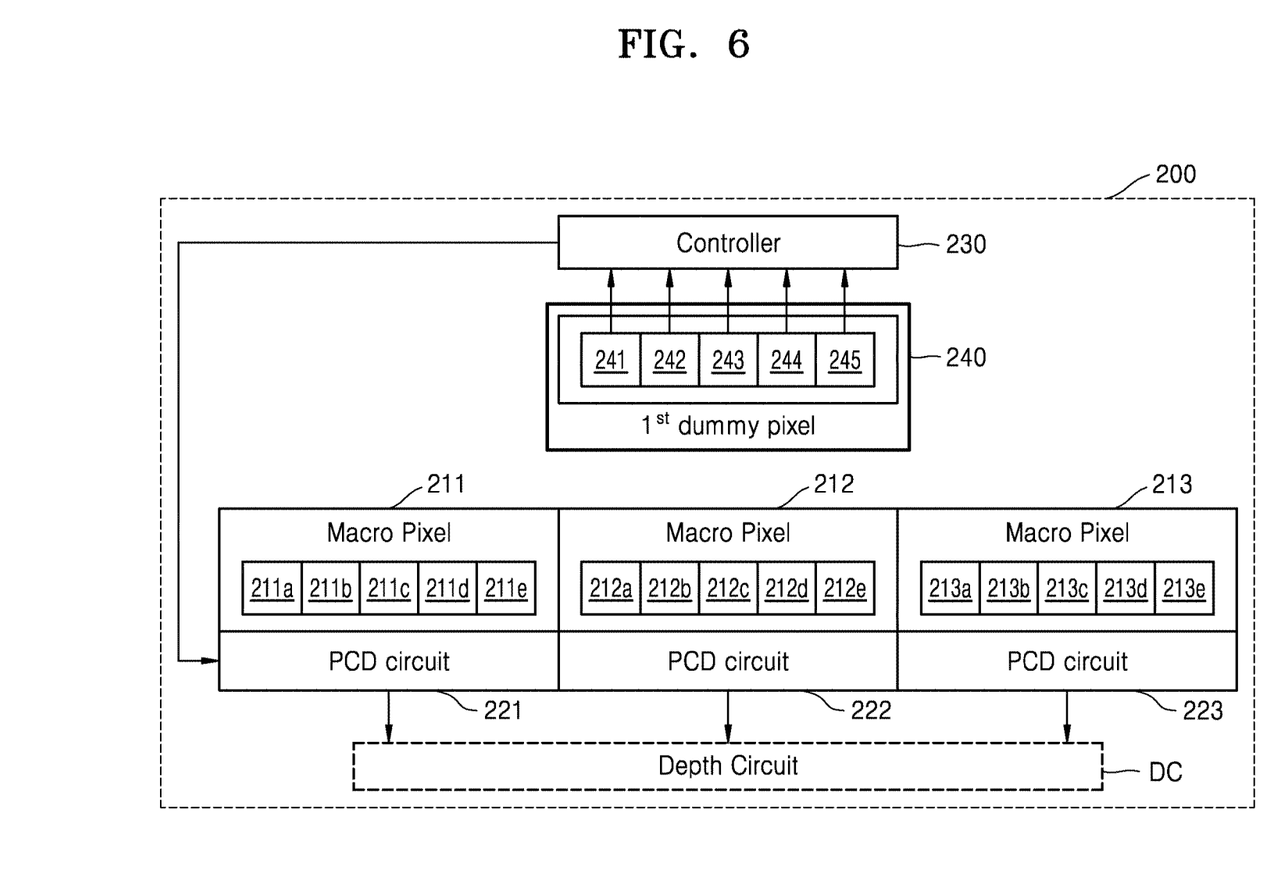
FIG. 6 is a diagram illustrating a schematic configuration of a depth sensor, according to another exemplary embodiment.

FIG. 6 is a diagram illustrating a schematic configuration of a depth sensor 200, according to another exemplary embodiment. In various exemplary embodiments, the depth sensor 200 may be shielded from the external light and may include a first dummy pixel 240 that measures the dark count.

As described above, the dark count may be measured by blocking the external light from macro pixels 211, 212, and 213 included in the depth sensor 200; however, an operation of the 3D camera may be limited. In various exemplary embodiments, the depth sensor 200 may be capable of obtaining an accurate measurement of the dark count without an effect on the operation of the 3D camera, by including the first dummy pixel 240 which is utilized in a measurement of the dark count, but not using the first dummy pixel in a measurement of a distance to the object while the external light is blocked.

The first dummy pixel 240 may be shielded so that the external light is blocked. First dummy elements 241, 242, 243, 244, and 245 may be photoelectric conversion elements and may be actually identical to photoelectric conversion elements 211a, 211b, 211c, 211d, and 211e. The number of first dummy elements 241 through 245 included in the first dummy pixel 240 may be identical to that of photoelectric conversion elements 211a through 211e, 212a through 212e, and 213a through 213e respectively included in each of macro pixels 211, 212, and 213. The reason is because an error in the measurement of the dark count may be reduced only when conditions for measuring the dark count need to be identical for the first dummy pixel 240 and each of macro pixels 211, 212, and 213.

Each of macro pixels 211, 212, and 213 according to one or more exemplary embodiments may be respectively connected to TDC circuits 221, 222, and 223. A detailed description of the TDC circuits 221, 222, and 223 is provided above with respect to FIGS. 4 and 5, and will be omitted.

The first dummy pixel 240 may include the plurality of dummy elements 241 through 245 and a controller 230 may measure the dark count from the first dummy pixel 240. The controller 230 may adjust the noise that relates to the plurality of macro pixels 211, 212, and 213 by changing the number of concurrence (NC) of the PCD circuit, based on the dark count.

Figure 7:
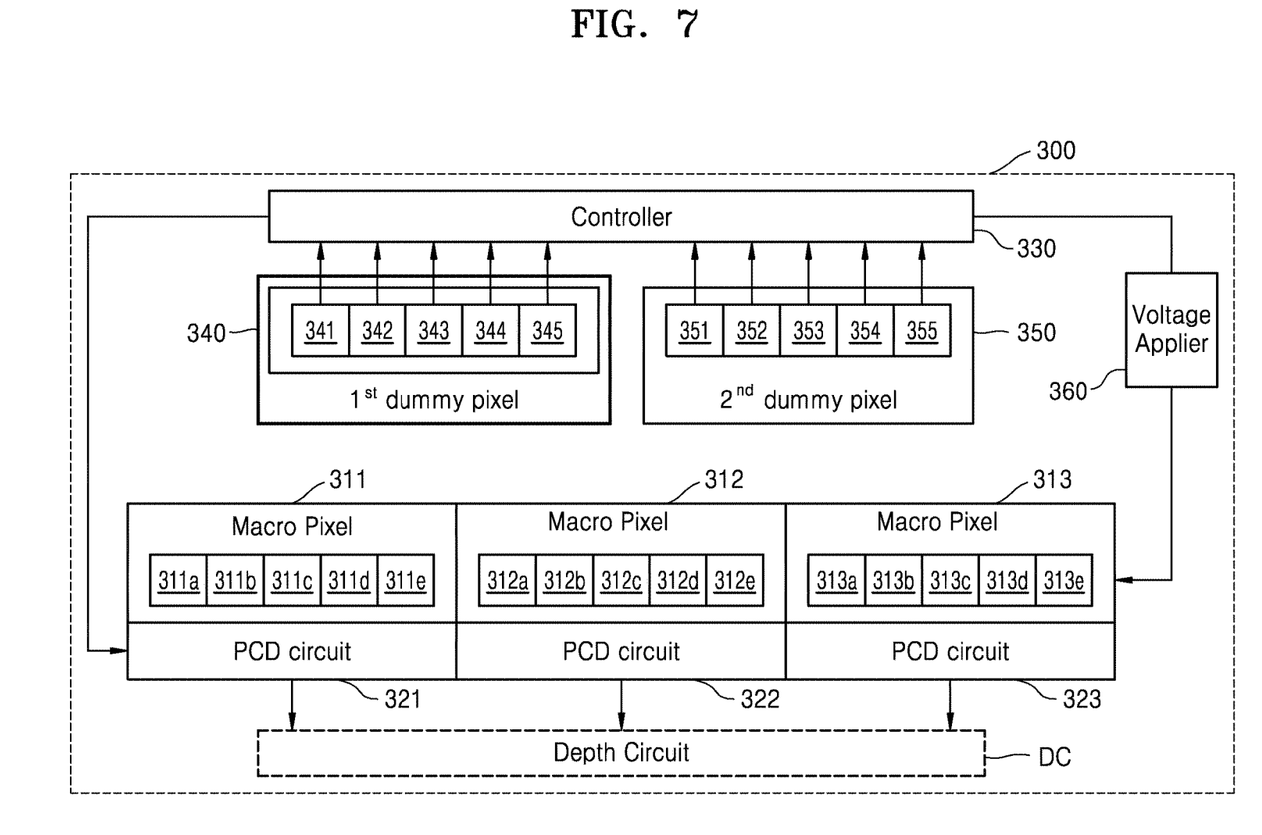
FIG. 7 is a diagram illustrating a schematic configuration of a depth sensor, according to another exemplary embodiment.

FIG. 7 is a diagram illustrating a schematic configuration of a depth sensor 300, according to another exemplary embodiment. Referring to FIG. 7, the depth sensor 300 may be configured to receive a flow of the external light thereinto, in addition to the configuration of the depth sensor 200 of FIG. 6, and may further include a second dummy pixel 350 that measures the dark count. A duplicate description will be omitted.

The depth sensor 300 may be exposed to not only light from the object but also the external light in a visible light range which includes the sunlight. Thus, the external light other than light irradiated from the light source (LS in FIG. 1) may be blocked by arranging the filter (F in FIG. 1) in the depth sensor 300. For example, the light source (LS in FIG. 1) may irradiate an infrared light, and the filter (F in FIG. 1) may be a filter that is configured to block the visible light.

As described above, when the external light is relatively intense, the external light may penetrate the filter (F in FIG. 1). Macro pixels 311, 312, and 313 may provide respective electric signals due to the penetrated external light, rather than due to reflected light from the object. PCD circuits 321, 322, and 323 may provide the respective output signal to the depth circuit (DC) based on the electric signals generated due to the external light. The output of electrical signals due to the external light does not result from the object and thus, is related to the noise. The output of electric signals is denoted as an external count and may be expressed, similarly as with respect to the dark count, as the number of electrons per time at a given temperature or as a current per unit sensor area at the given temperature.

Each of macro pixels 311, 312, and 313 according to one or more exemplary embodiments may utilize photoelectric conversion elements that have a relatively high light sensitivity and thus, when the external light is delivered, all of photoelectric conversion elements 311a through 311e, 312a through 312e, and 313a through 313e may generate respective electric signals. Since the noise due to the external light is generally generated when an intensity of light is relatively strong, all of photoelectric conversion elements 341, 342, 343, 344, and 345 included in a first dummy pixel 340 may generate respective electric signals. In this case, an adjustment of the number of concurrence (NC) may not be adequate to eliminate the noise. Thus, a controller 330 may directly reduce the sensitivity of photoelectric conversion elements by adjusting the reverse bias voltage applied to macro pixels 311, 312, and 313. Referring to FIG. 2, since the sensitivity of the photo diode that is operating in the second and third ranges varies according to a magnitude of the reverse bias voltage, the noise due to the external light with a relatively strong effect may be controlled by adjusting the magnitude of the reverse bias voltage.

The second dummy pixel 350 may include a plurality of second dummy elements 351, 352, 353, 354, and 355 and receive the flow of the external light flow thereinto. Second dummy elements 351 through 355 may be photoelectric conversion elements that are actually identical to the photoelectric conversion elements 211a through 211e, 212a through 212e, and 213a through 213e. The number of second dummy elements 351 through 355 included in the second dummy pixel 350 may be identical to that of photoelectric conversion elements included in each of macro pixels 311, 312, and 313. The reason is because an error in the measurement of the external light count may be reduced when conditions for performing measurements are required to be identical for the second dummy pixel 350 and each of macro pixels 311, 312, and 313.

The controller 330 may measure the external light count of the second dummy pixel 350 and may control a voltage applier 360 to adjust the reverse bias voltage applied to macro pixels 311, 312, and 313, based on the external light count of the second dummy pixel 350. The voltage applier 360 may be a device that is configured to apply the reverse bias voltage to drive macro pixels 311, 312, and 313. Selection of the reverse bias voltage is implemented by employing a method similar to the above-described adjustment method of the number of concurrence (NC) and an adequate reverse bias voltage may be selected by monitoring a relationship between the noise of the image of the 3D camera and the reverse bias voltage.

The controller 330 may adjust the reverse bias voltage, based on a value obtained by subtracting the dark count measured in the first dummy pixel 340 from the external light count measured in the second dummy pixel 350. The reason is because not only an electric signal due to the external light count but also an electric signal due to the dark count are included in the electric signal generated in the second dummy pixel 350.

Figure 8:
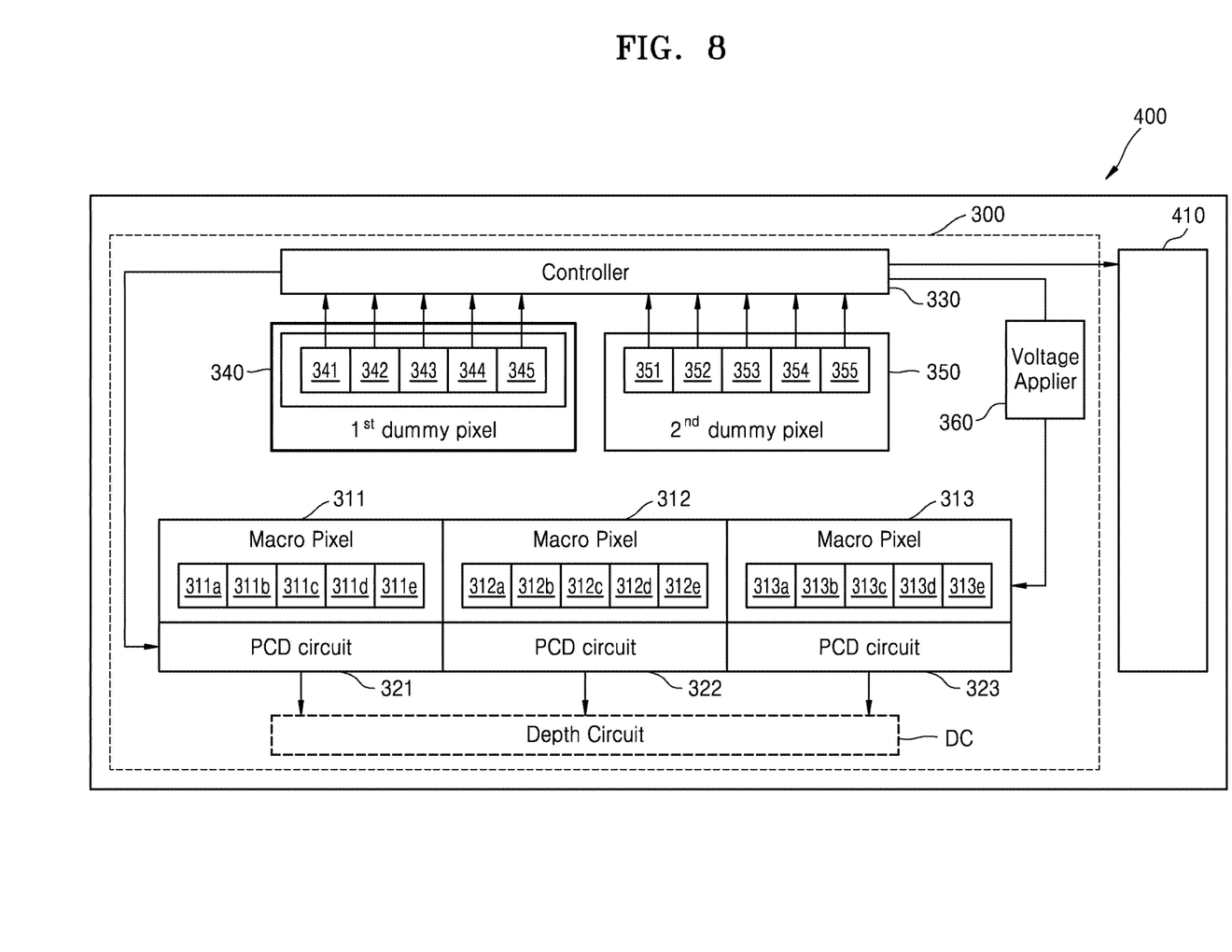
FIG. 8 is a diagram illustrating a schematic configuration of a 3D camera, according to an exemplary embodiment.

FIG. 8 is a diagram illustrating a schematic configuration of a 3D camera 400, according to an exemplary embodiment. In various exemplary embodiments, the 3D camera 400 may include a light source 410 (LS) controlled by the depth sensor 300 and the controller 330. The configuration of the depth sensor 300 is actually identical to that of FIG. 7 and a duplicate description will be omitted.

The controller 330 may increase the number of concurrence (NC) or reduce the magnitude of the reverse bias voltage applied to macro pixels 311, 312, and 313 in order to eliminate the noise, as described above. The controller 330 may compensate for a reduction in the sensitivity of macro pixels 311, 312, and 313 due to a noise elimination operation by controlling an light output of the light source 410. For example, when the controller 330 increases the number of concurrence (NC), an overall generation of the output signal provided by the PCD circuit 321 to the depth circuit (DC) may be reduced. An absence of an output signal may denote that there is no light information in macro pixels 311, 312, and 313 and may denote that the sensitivity of macro pixels 311, 312, and 313 has been degraded.

The controller 330 may control macro pixels 311, 312, and 313 by increasing the light output of the light source 410 so that the generation of the output signal from macro pixels 311, 312, and 313 may reach a sufficient level to form a 3D image. In addition, for example, when the controller 330 reduces the reverse bias voltage of macro pixels 311, 312, and 313, the sensitivity of macro pixels 311, 312, and 313 may be reduced with respect to not only the external light but also light generated from the light source 410. Since the increase in the light output of the light source 410 does not affect the generation of the output signal due to the external light, the controller 330 may control macro pixels 311, 312, and 313 by maintaining the noise elimination effect due to the reduction in the reverse bias voltage as described above, so that the generation of the output signal from macro pixels 311, 312, and 313 may reach a sufficient level in order to form a 3D image.

Figure 9:
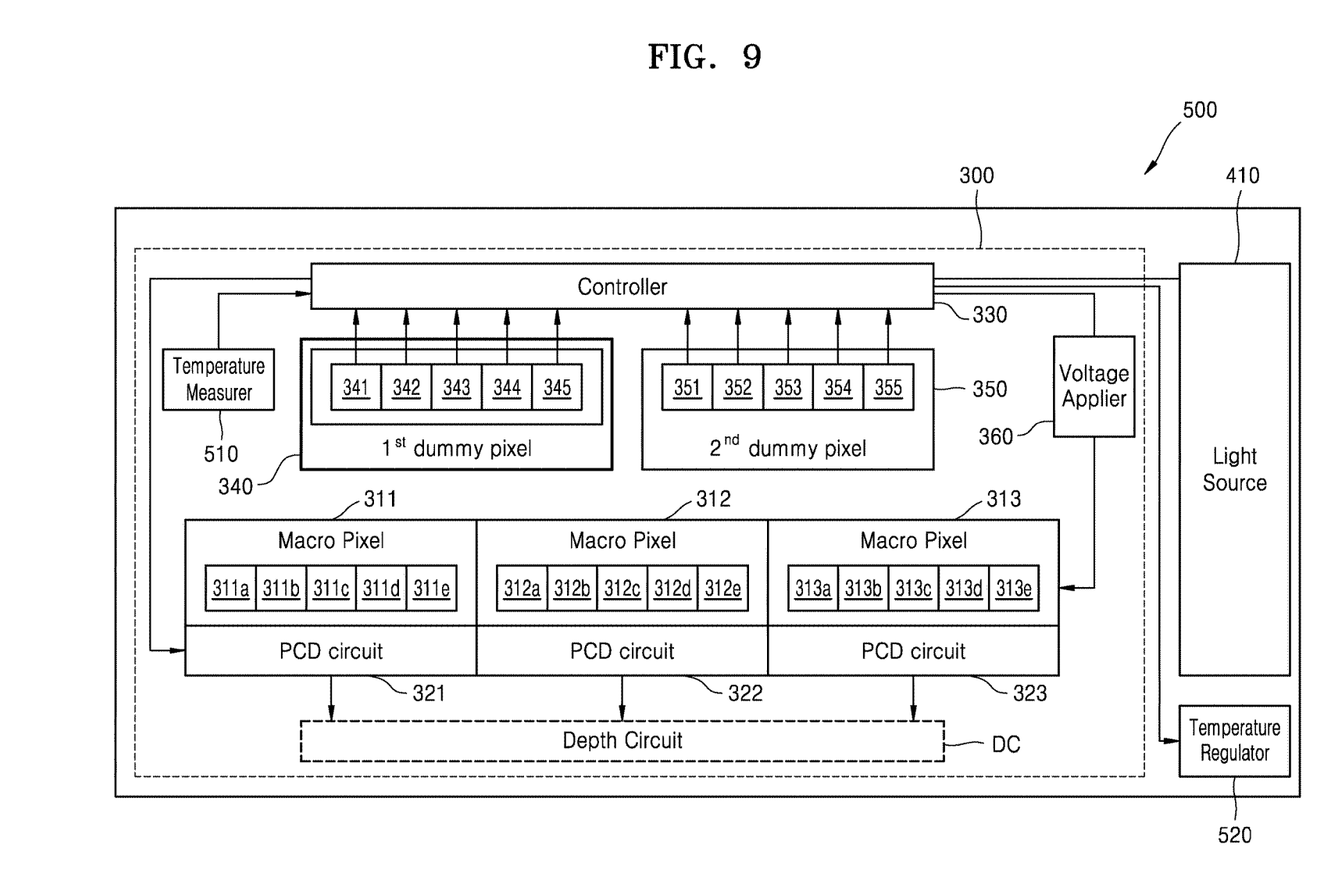
FIG. 9 is a diagram illustrating a schematic configuration of a 3D camera, according to another exemplary embodiment.

FIG. 9 is a diagram illustrating a schematic configuration of a 3D camera 500, according to another exemplary embodiment. In various exemplary embodiments, the 3D camera 500 may include a temperature measurement unit (also referred to herein as a "temperature measurer") 510 and a temperature controller (also referred to herein as a "temperature regulator") 520. The configuration of the 3D camera 500 is actually identical to that of the 3D camera 400 of FIG. 8 and a duplicate description will be omitted.

The temperature measurement unit 510 may measure a temperature inside the depth sensor 300. The dark count may be affected by the temperature. Since the dark count increases as the temperature increases, the noise of the depth sensor 300 may also increase. The temperature measurement unit 510 may deliver a measured temperature inside the depth sensor 300 to the controller 310. The controller 310 may utilize the delivered temperature measurement from inside the depth sensor 300 as an indicator for eliminating the noise of macro pixels 311, 312, and 313. For example, when the temperature inside the depth sensor 300 increases, the controller 330 may control a temperature regulator 520 arranged inside the 3D camera 500, lower the temperature inside the depth sensor 300, and eliminate the noise due to the dark count. Alternatively, for example, the controller 300 may eliminate the noise due to the dark count by changing the number of concurrence (NC) of the PCD circuit 321.

Alternatively, for example, the controller 330 may eliminate the noise due to the dark count by controlling the voltage applier 360 to reduce the reverse bias voltage applied to macro pixels 311, 312, and 313.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A depth sensor comprising:
a first dummy pixel comprising a plurality of first dummy elements and configured to be shielded from external light;
a macro pixel configured to photoelectrically convert input light and to provide an electric signal, the macro pixel comprising a plurality of photoelectric conversion elements;
a programmable concurrence detector (PCD) circuit configured to compare the electric signal with a number of concurrence (NC) that relates to the macro pixel and to determine a necessity of providing an output signal that corresponds to the macro pixel;
a depth circuit configured to receive the output signal from the PCD circuit and to obtain distance information that corresponds to the output signal; and
a controller configured to measure a dark count that relates to the first dummy pixel, to change the number of concurrence (NC) based on the measured dark count, and to control noise that relates to the macro pixel.

2. The depth sensor of claim 1, wherein the PCD circuit comprises:
a signal generator configured to supply a composite signal current to a first node in response to the electric signal;
a reference current supplier configured to supply, to the first node, a composite reference current that corresponds to the number of concurrence (NC); and
a current comparator connected to the first node and configured to provide the output signal that corresponds to the macro pixel when a magnitude of the composite signal current is greater than a magnitude of the composite reference current.

3. The depth sensor of claim 2, wherein the signal generator comprises:
a plurality of signal generator switches, each signal generator switch being configured to switch between an ON state and an OFF state in response to a respective constituent electric signal generated by a corresponding one from among the plurality of photoelectric conversion elements; and
a plurality of signal current sources, each signal current source being connected to a corresponding one from among the plurality of signal generator switches and configured to supply a respective constituent signal current to the first node when the corresponding signal generator switch is in the OFF state,
wherein the composite signal current supplied by the signal generator is a sum of the constituent signal currents supplied to the first node.

4. The depth sensor of claim 3, wherein the reference current supplier comprises:
a plurality of reference current supplier switches, each reference current supplier switch being configured to be switched between the ON state and the OFF state by the controller, based on the NC; and
a plurality of reference current sources, each reference current source being connected to a corresponding one from among the plurality of reference current supplier switches and configured to supply a respective constituent reference current to the first node when the corresponding switch is in the OFF state,
wherein the composite reference current is a sum of the constituent reference currents supplied to the first node.

5. The depth sensor of claim 4, wherein each of the plurality of signal current sources and each of the plurality of reference current sources is further configured to supply a respective current having a same magnitude.

6. The depth sensor of claim 5, further comprising an additional current source configured to supply, to the first node, an additional current that has a magnitude less than the magnitude of each of the respective currents supplied by each of the plurality of signal current sources and by each of the plurality of reference current sources.

7. The depth sensor of claim 1, wherein a number of the first dummy elements included in the first dummy pixel is equal to a number of the photoelectric conversion elements included in the macro pixel.

8. The depth sensor of claim 1, further comprising:
a second dummy pixel comprising a plurality of second dummy elements and configured to receive a flow of the external light into the second dummy pixel,
wherein the controller is further configured to measure an external light count that relates to the second dummy pixel and to adjust a reverse bias voltage applied to the macro pixel, based on the measured external light count.

9. The depth sensor of claim 8, wherein the controller is further configured to adjust the reverse bias voltage based on a value obtained by subtracting the measured dark count from the measured external light count.

10. The depth sensor of claim 1, further comprising a temperature measurer configured to measure an internal temperature of the depth sensor,
wherein the controller is further configured to control the noise that relates to the macro pixel based on the measured internal temperature of the depth sensor.

11. The depth sensor of claim 10, wherein the controller is further configured to change the number of concurrence (NC) based on the measured internal temperature of the depth sensor.

12. The depth sensor of claim 10, wherein the controller is further configured to control the noise that relates to the macro pixel by lowering the internal temperature of the depth sensor.

13. A three-dimensional (3D) camera comprising:
the depth sensor according to claim 1; and
a light source (LS) configured to irradiate light toward an object.

14. The 3D camera of claim 13, wherein the depth sensor further comprises a second dummy pixel which is configured to receive a flow of the external light, and wherein the controller is further configured to measure an external light count that relates to the second dummy pixel and to adjust a reverse bias voltage applied to the macro pixel, based on the measured external light count.

15. The 3D camera of claim 13, wherein the controller is further configured to compensate for a reduction in a sensitivity that is caused by the controlling the noise that relates the macro pixel, by adjusting the light source.

16. The 3D camera of claim 15, wherein the controller is further configured to increase a light output of the light source when the number of concurrence is increased.

17. The 3D camera of claim 14, wherein the controller is further configured to increase a light output of the light source when the reverse bias voltage applied to the macro pixel is reduced.

18. A method for controlling a depth sensor, the depth sensor comprising: a macro pixel comprising a plurality of photoelectric conversion elements, the macro pixel being configured to photoelectrically convert an input light and to provide a current signal; and a programmable concurrence detector (PCD) circuit configured to compare the current signal with a number of concurrence (NC) and to determine a necessity of providing an output signal that corresponds to the macro pixel, the method comprising:

providing a first dummy pixel comprising a plurality of first dummy elements and configured to be shielded from external light;

measuring a dark count that relates to the first dummy pixel; and controlling noise that relates to the macro pixel by changing the number of concurrence (NC), based on the measured dark count.

19. The method of claim 18, further comprising:

measuring an external light count that relates to a second dummy pixel which comprises a plurality of second dummy elements and which is configured to receive a flow of the external light; and controlling the noise that relates to the macro pixel by adjusting a reverse bias voltage applied to the macro pixel, based on the measured external light count.

20. The method of claim 19, wherein the controlling the noise that relates to the macro pixel comprises adjusting the reverse bias voltage based on a value obtained by subtracting the measured dark count from the measured external light count.

* * * * *